United States Patent [19]

Lee et al.

[11] Patent Number: 5,142,436
[45] Date of Patent: Aug. 25, 1992

[54] PIERCING THROUGH TYPE CAPACITOR

[75] Inventors: Soo-Cheol Lee; Kwang-Hee Jung; Chi-Ho Kim, all of Suweon, Rep. of Korea

[73] Assignee: Samsung Electro-Mechanics Co., Ltd., Kyungki, Rep. of Korea

[21] Appl. No.: 657,743

[22] Filed: Feb. 19, 1991

[30] Foreign Application Priority Data

Feb. 27, 1990 [KR] Rep. of Korea ............... 90-2176
May 30, 1990 [KR] Rep. of Korea ............... 90-7483
Jun. 29, 1990 [KR] Rep. of Korea ............... 90-9325

[51] Int. Cl.$^5$ .................................... H01G 4/42
[52] U.S. Cl. ........................................ 361/302
[58] Field of Search ............. 361/302, 306, 321, 328, 361/329, 330, 540; 29/25.42

[56] References Cited

U.S. PATENT DOCUMENTS 4,370,698 1/1983 Sasaki ........................... 361/330

Primary Examiner—Donald A. Griffin
Attorney, Agent, or Firm—Webb, Burden, Ziesenheim & Webb

[57] ABSTRACT

This invention relates to a piercing through type capacitor used in high voltage high frequency wave device, which is comprised of: ceramic disc having two separated electrodes on top surface and common electrode on bottom surface; grounding plate which is made by a locating means of elongated oval shape to be laid with said ceramic disc thereon, an elongated oval protuberance having large elongated oval piercing through opening at central portion, and a number of small piercing through holes around said elongated oval protuberance with keeping a predetermined distance therefrom; insulation case of elongated oval hollow column which is made integrally with upper and lower insulation case for surrounding the ceramic disc at both sides of said grounding plate; a pair of piercing through conductors in which a pair of metal caps which are provided to each of said two separated electrodes on the top surface of said ceramic disc and having protrusions at each periphery are fixed by soldering or welding; a pair of insulation tubes for covering each piercing through bar of said piercing through conductor, and epoxy insulation resin material filled to a part of upper portion and to a part of lower portion of said integral type insulation case.

20 Claims, 16 Drawing Sheets

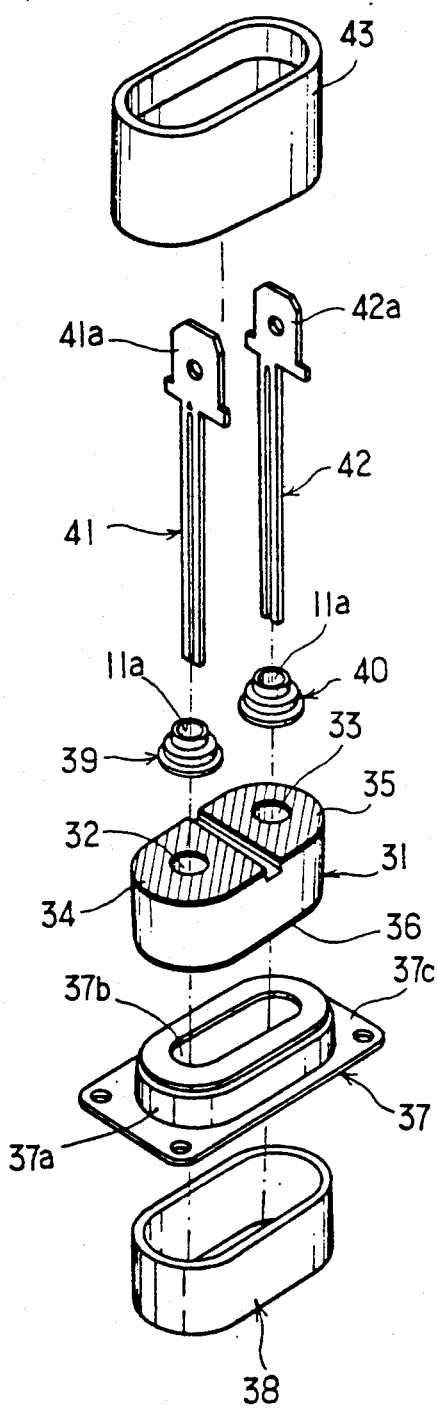
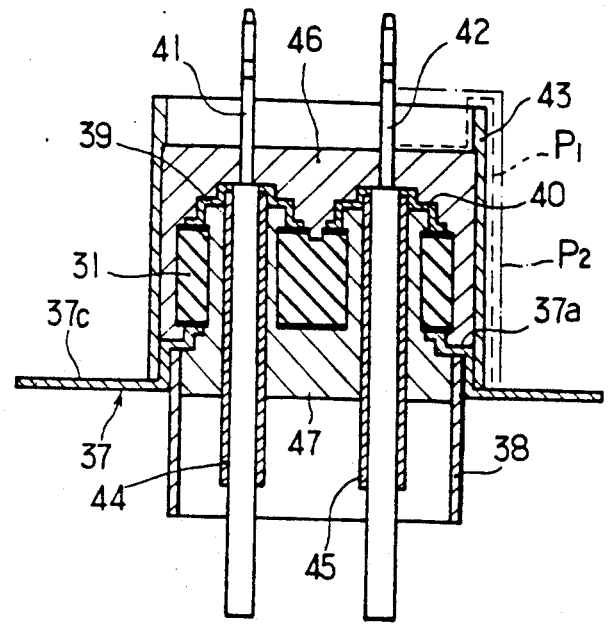
FIG. 4 PRIOR ART
FIG. 5 PRIOR ART

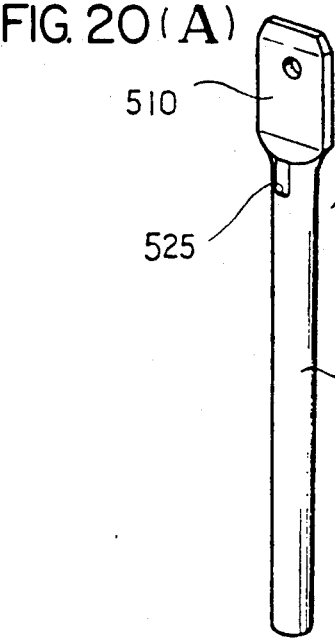
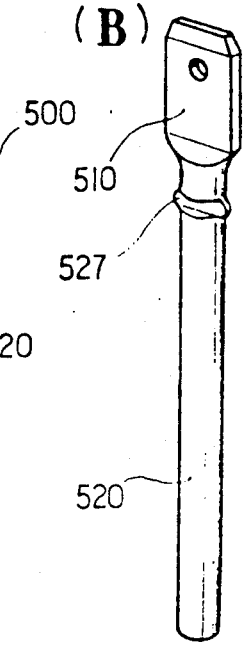
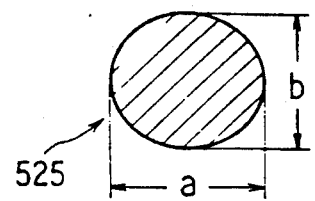
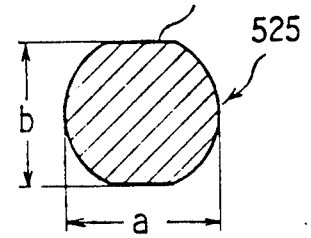
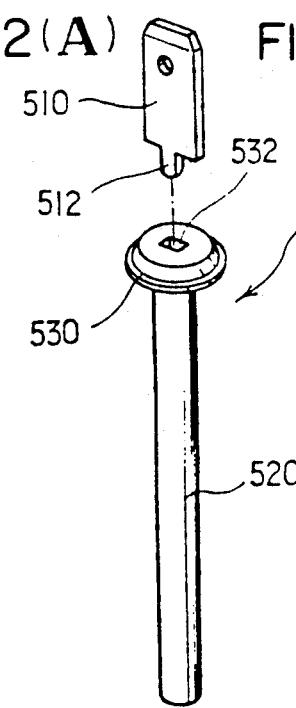
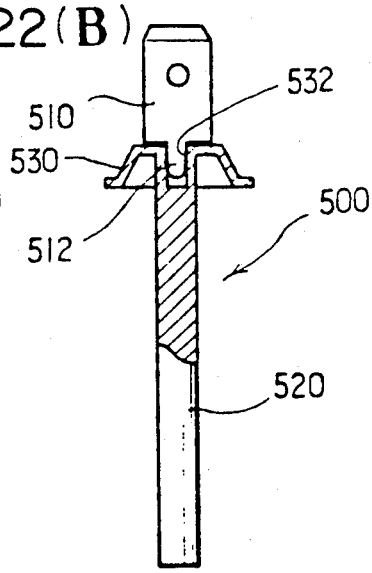

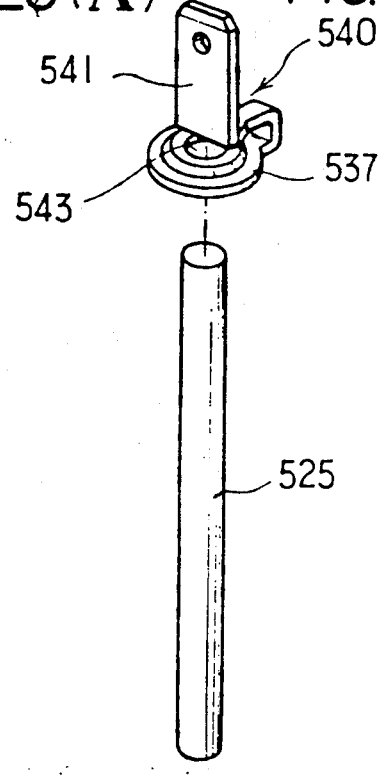
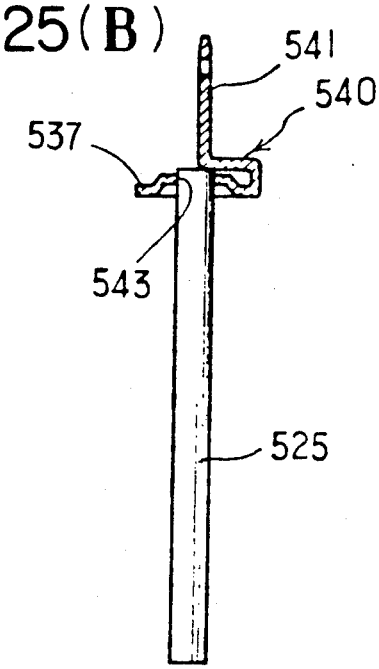
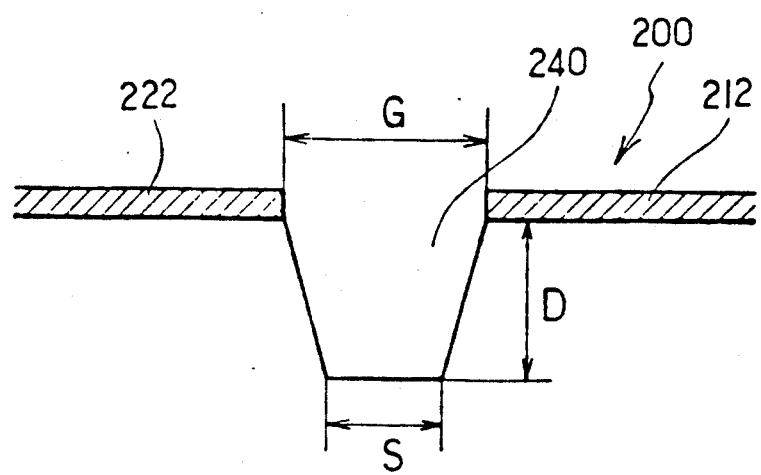

PIERCING THROUGH TYPE CAPACITOR

BACKGROUND OF THE INVENTION

1. Technical Field

The present invention relates to a piercing through type capacitor made of two piercing through holes, and more particularly to a piercing through type capacitor which is used in either high voltage high frequency device such as microwave oven, or large power electromagnetic wave device such as transmitter for broadcasting station or X-ray generator.

Generally, a piercing through type capacitor element used in high voltage high frequency device employs ceramic capacitor.

In ceramic capacitors, piled type ceramic capacitor has become widely used rapidly from the requirement of miniaturizing as well as becoming to larger capacity.

Ultra high frequency wave (300 MHz–3000 MHz) required at said broadcasting instrument or microwave oven and the like is normally obtained from magnetron device.

FIG. 1 is a circuit diagram of noise filter connected to power supply line of magnetron heater within normal microwave oven.

Wherein capacitors C1, C2 and inductor L1, L2 make a noise filter, and reference numeral 100 is conductive filter housing, numeral 102 represents magnetron, numeral 104 represents heater of magnetron 102, and numeral 106 is anode of magnetron 102 and said anode 106 is grounded.

Since the magnetron has high operating voltage between anode electrode and heater, said capacitors Cl, C2 should be the capacitor for withstanding against high voltage. Since said capacitors receive respectively high temperature heat within a microwave oven, they should have excellent temperature characteristics.

The present invention relates to an improved structure of capacitor used as noise filter within such microwave oven.

The capacitor of such object should be piercing through type capacitor, and two separate capacitors or twin capacitors within single housing are utilized for above-described object.

Such magnetron device obtains very high frequency (basic wave: 2.45 GHz) by applying accelerating voltage (−4.2 KV) to magnetron within shielded shielding case.

Since said magnetron should be completely shielded from exterior as far as possible, accelerating voltage should be supplied to the magnetron necessarily through the piercing through type capacitor.

2. Prior Art

Said piercing through type capacitor is typical conventional piercing through type capacitor as described in U.S. Pat. No. 4,370,698 as shown in FIGS. 2 and 3, which has elliptic ceramic 1 having a pair of piercing through holes over its thickness. A pair of separate electrodes 4, 5 respectively having a corresponding piercing through hole are provided on top surface of ceramic material 1, and common electrode having corresponding piercing through holes is provided on its bottom surface. Grounding plate 7 is provided with rectangular plate 7c and protuberance 7a. The rectangular plate 7c has four perforated holes for fixing capacitor assembly to filter housing (not shown) by utilizing screw or rivet.

The protuberance 7a has a pair of piercing through holes 9, 10 corresponding respectively to two holes 2, 3 of the ceramic material 1.

And, the protuberance 7a has a number of small piercing through holes 7b along the periphery thereof. Since the common electrode 6 is provided at the protuberance 7a of the grounding plate 7, the piercing through holes 9, 10 are superposed respectively with two holes 2, 3, and small piercing through holes 7b are located at exterior of the ceramic material 1. A pair of long rod 11, 12 have tabs 20, 21, and these are to be connected to receptacle terminals of external circuit (not shown). The rods 11, 12 are inserted respectively to the piercing through holes 9, 10 of the grounding plate 7 and two holes 2, 3 of the ceramic material 1. In order to ensure the insulation between the common electrode 6 and the rods 11, 12, the conductive rods 11, 12 are covered by insulation tubes 15, 16 made from, for example, silicone rubber and the like.

Said insulation tubes 15, 16 absorb contraction stress of injected filler 17 produced at heating and vucanizing process, and hence it serves a function for preventing the generation of cracks and the like in the volcanized filler 17.

Said rods 11, 12 are connected also electrically to metal caps 13, 14 respectively provided to the electrodes 4, 5.

And, the rods 11, 12 are respectively welded to the caps 13, 14. Further, the caps 13, 14 have respectively protuberance having a number of small holes 13a, 14a. Elliptic cylinder type hollow plastic cover 8 is attached to the bottom of the grounding plate 7 and this surrounds the rods 11, 12 and the tubes 15, 16. Lower end of the cover 8 is so designed that passes the lower end of the tubes 15, 16 and then protruding a little. The cover 8 should necessarily be elliptic hollow cylinder having a pair of parallel long linear walls 8a, 8b and a pair of semicircular walls 8d, 8e for connecting these long linear walls. The cover 8 has a bridge 8c traversing said parallel long linear walls at upper middle portion of this, and this bridge divides the cover 8 into two regions of substantially circular form. As shown in said FIG. 3, insulation filler 17 which is, for example, epoxy resin surrounds the ceramic material 1, rods 11, 12 and caps 13, 14. In the injecting process of insulation filler, the capacitor body is covered by the cover 18, and then the filler 17 is injected through the opening of the bottom of cover 8 into the cover 18. The insulation filler injected from the bottom passes through the small holes 7b provided to the grounding plate 7 and the small holes 13a, 14a provided to the caps 13, 14, and accordingly interior space region of the cover 18 is filled by the insulation filler. After said injected filler is valcanized, when the cover 18 is removed away, twin capacitor assembly is made. Consequently, not only the insulating endurance but also protection against oil, moisture and dust are ensured by said injection epoxy resin.

FIGS. 4 and 5 show some other example for the conventional piercing through hole type twin capacitor (for example, refer to Japanese Utility model laid open publication gazette No. 106330/85). Wherein elliptic ceramic material 31 has a pair of holes 32, 33 across its thickness. A pair of separate electrodes 34, 35 having the corresponding piercing through holes are provided on the top surface of the ceramic material 31, and common electrode 36 having the corresponding piercing through holes is provided at its bottom surface. Grounding plate 37 has protuberance 37a as well as rectangular plate 37c. The rectangular plate 37c has four perforated holes for fixing the capacitor to filler housing (not shown).

The protuberance 37a has substantially elliptic piercing through hole 37b. A pair of long piercing through strip rods 41, 42 formed integrally with tabs 41a, 42b at their top ends are respectively inserted through metal caps 39, 40, holes 32, 33 to elliptic hole 37b. The strip rods 41, 42 are respectively soldered to the metal caps 39, 40 provided to the electrodes 34, 35 respectively. The strip rods 41, 42 are also respectively covered by insulation tubes 44, 45 for same object as aforementioned tubes 15, 16. Elliptic cylinder type major plastic cover 38 is attached on the grounding plate 37 and it surrounds the lower portions of the strip rods 41, 42 covered with tubes 44, 45. In this structure, the bottom end of the cover should be so designed that passes the bottom end of the tubes 44, 45 and protruding a little as shown in said FIG. 5. Another elliptic cylinder type plastic cover 43 is provided on the grounding plate, and as shown in FIG. 5, it surrounds the ceramic material 31, caps 39, 40 and upper portion of the strip rods 41, 42.

The epoxy resin is injected not only to the opening of the cover 38 but also to the upper cover 43 of its interior. This is because the metal caps 39, 40 and the protuberance 37a have no small piercing holes as shown in said FIGS. 2 and 3, and accordingly the assembly is completely divided into two housings. The insulation filler 46 surrounds the exterior of the ceramic material 31 and the caps 39, 40 as well as upper portion of the strip rods 41, 42. Other insulation filler 47 surrounds the interior of the caps 39, 40 and middle portions of the strip rods 41, 42 covered with tubes 44, 45.

However, the conventional capacitor of said FIGS. 2 and 3 has following disadvantages. As described in above, the lower free end of the cover 8 is so designed that passes the bottom end of the tubes 15, 16 and protruding a little. Under this structure, even if relatively lower voltage is applied to the capacitor, electric discharge between the tabs 20, 21 and graounding plate 7 are started. Such electric discharge hurts human body, and therefore, when the capacitor is used in oily, dusty and dampish environment such as kitchen, that is, in a environment which is anticipated that large quantity of oil, dust and/or moisture may be deposited on the exposed bottom surface of the tabs 20, 21, the filler 17 and/or the cover 8, then it is serious.

And next, after the rods 11, 12 having the tabs 20, 21 are inserted to the holes 9, 10, other holes 2, 3 and metal caps 13, 14 respectively, the filler 17 is injected from the opening of the cover 8 between them. Therefore, in the filling process of the filler, there may be possibility that the insulation resin will be accidentally deposited on the surface of the tabs 20, 21. This will disturb the setting of electrical connection between the tab and receptacle terminal (not shown) to be attached to the tab.

Said conventional two piercing through type twin capacitor of FIGS. 4 and 5 has following disadvantages in addition to the advantages as the capacitor of FIGS. 2 and 3. When the capacitor is used in oily, disty and moist environment, the oil, dust and moisture will be deposited on the exposed top surface of the filler 46, exposed surface of the rods 41, 42, and interior and exterior surfaces of upper cover 43. Particularly, since some recesses is formed on the surface of the filler 46 and on the vertical wall of the cover 43, a large quantity of oil, dust and moisture are liable to be deposited on the surface of the filler. This will cause a substantial decrease of surface resistance of path P1 which extends from the rods 41, 42 through the surface of the filler 46 and the surface within the cover 43 to the grounding plate 37. That is, as shown by symbol P2 of FIG. 3, insulation creeping distance of path becomes substantially shorter by the oil, dust and moisture deposited on the recesses. Electric discharge starting voltage depends upon the insulation creeping distance. Therefore, when a large quantity of oil and the like are deposited on the recesses, the creeping distance or surface resistance is decreased, and accordingly, even when relatively lower voltage is applied to a capacitor, discharge following along said path is liable to be happened.

For these disadvantages, it can be readily thought to remove the upper cover 43 portion protruded to upward by passing through the exposed surface of the filler 46, that is, to make that the recess to be deposited with oil and the like is not produced. However, said method is not suitable because the insulation creeping distance will be decreased by the creeping distance provided by removed protrusion of upper cover 43.

And, according to the piercing through type capacitor of the conventional technique, since the upper cover 43 and lower cover 38 having the insulation function are separately structured respectively, parts of complicated structural form are increased whereby manufacturing process is difficult and complicated, and according to this, working efficiency and productivity are reduced and consequently it has been caused a factor of cost rising.

And, in case of assembling by inserting the upper cover 43 and lower cover 38 to the grounding plate 37, when dimensional error is large, damage of upper or lower cover 43, 38 is apt to be occurred, and since many of assembling parts of the piercing through type capacitor are not completely sealed upon injecting the insulation resin material, said insulation resin material may be leaked, and therefore badness of the product has been liable to be produced.

OBJECT AND SUMMARY OF THE INVENTION

Therefore, the present invention is such various problems of aforementioned conventional technique, and it is an object of the present invention to provide a piercing through type capacitor in which the parts and manufacturing processes of the capacitor are reduced, working efficency and productivity are improved, and position determining of assembling parts is correct so that badness to be produced in manufacturing the capacitor is remarkable decreased.

Another object of the present invention is to provide a piercing through type capacitor in which there is none of requirement to assemble by inserting the grounding plate and insulation case each other whereby breaking down of the insulation case due to the insertion assembling is prevented and handling becomes easy.

Still another object of the present invention is to provide a piercing through type capacitor in which upper insulation material and lower insulation material of the piercing through type capacitor are made into integral form so that leaking phenomenon upon injecting the epoxy insulation resin is prevented whereby reliability of the product is improved.

Technical construction for accomplishing the aforementioned objects of the present invention is characterized by comprising :

ceramic disc formed with inverse trapezoidal groove by distance, depth and internal surface distance of electrode insulation between upper two electrodes;

grounding plate which is made by semicircular groove type locating means that said ceramic disc is laid thereon, elliptic protuberance having large elliptic piercing hole at center, and a number of small piercing through holes by keeping a predetermined distance from said elliptic protuberance;

elliptic hollow cylindrical insulation case which is made integrally with lower insulation case and upper insulation case surrounding the ceramic disc at upper portion around said grounding plate;

a pair of piercing conductors in which a pair of metal caps which are provided respectively to upper separated electrode pair of said ceramic disc and having protrusions at each periphery are fixed by soldering and the like;

a pair of insulation tubes for covering respectively the piercing rods of said piercing conductors; and epoxy insulation resin material filled into a part of upper portion and a part of lower portion of said integrally formed insulation case.

The forgoing and other objects as well as advantages of the present invention will become clear by following description of the invention with reference to the accompanying drawings.

BRIEF DESCRIPTION OF THE DRAWINGS

For a better understanding of the invention, and to show how the same may be carried out into effect, reference will how be made, by way of example, with respect to the accompanying drawings, in which :

FIG. 4 is an exploded perspective view of another conventional piercing through type capacitor, FIG. 5 is a vertical cross sectional view of FIG. 4, FIG. 26 is a cross sectional view of a ceramic disc according to the eleventh embodiment of the present invention.

Throughout the drawings, like reference numerals and symbols are used for designating like or equivalent parts or portions, for simplicity of illustration and explanation.

DETAILED DESCRIPTION OF THE PREFERRED EMBODIMENTS

Hereinafter, the preferred embodiments of the present invention will be described in detail with reference to the accompanying drawings as followings.

Figure 1:
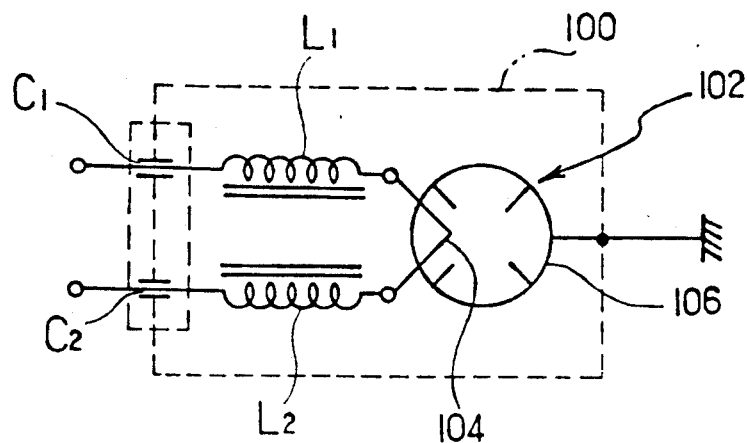
FIG. 1 is a wiring diagram in which the piercing through type capacitor is generally utilized to magnetion.
Figure 2:
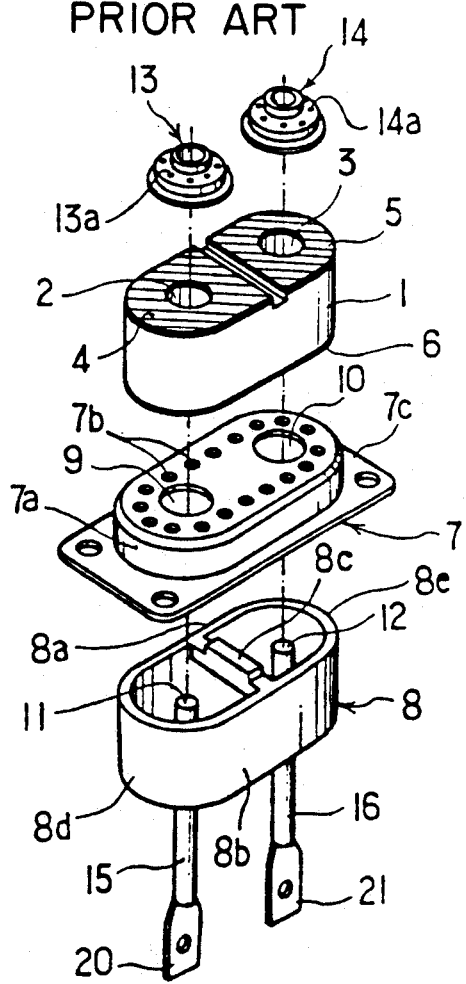
FIG. 2 is an exploded perspective view of conventional piercing through type capacitor.
Figure 3:
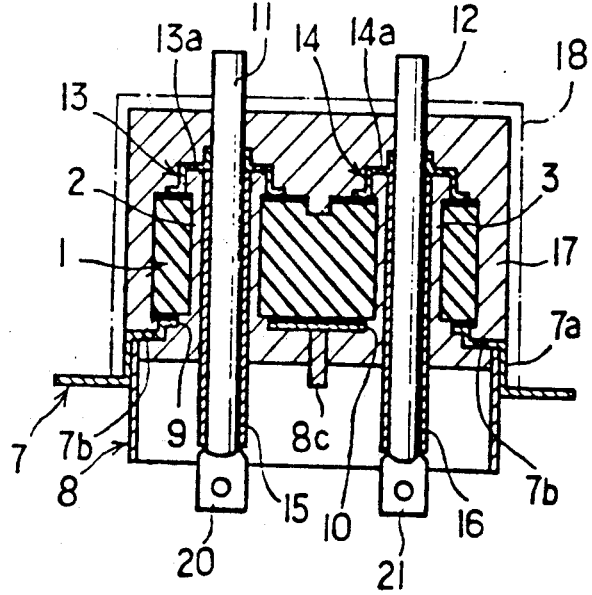
FIG. 3 is a vertical cross sectional view of FIG. 2.
Figure 6:
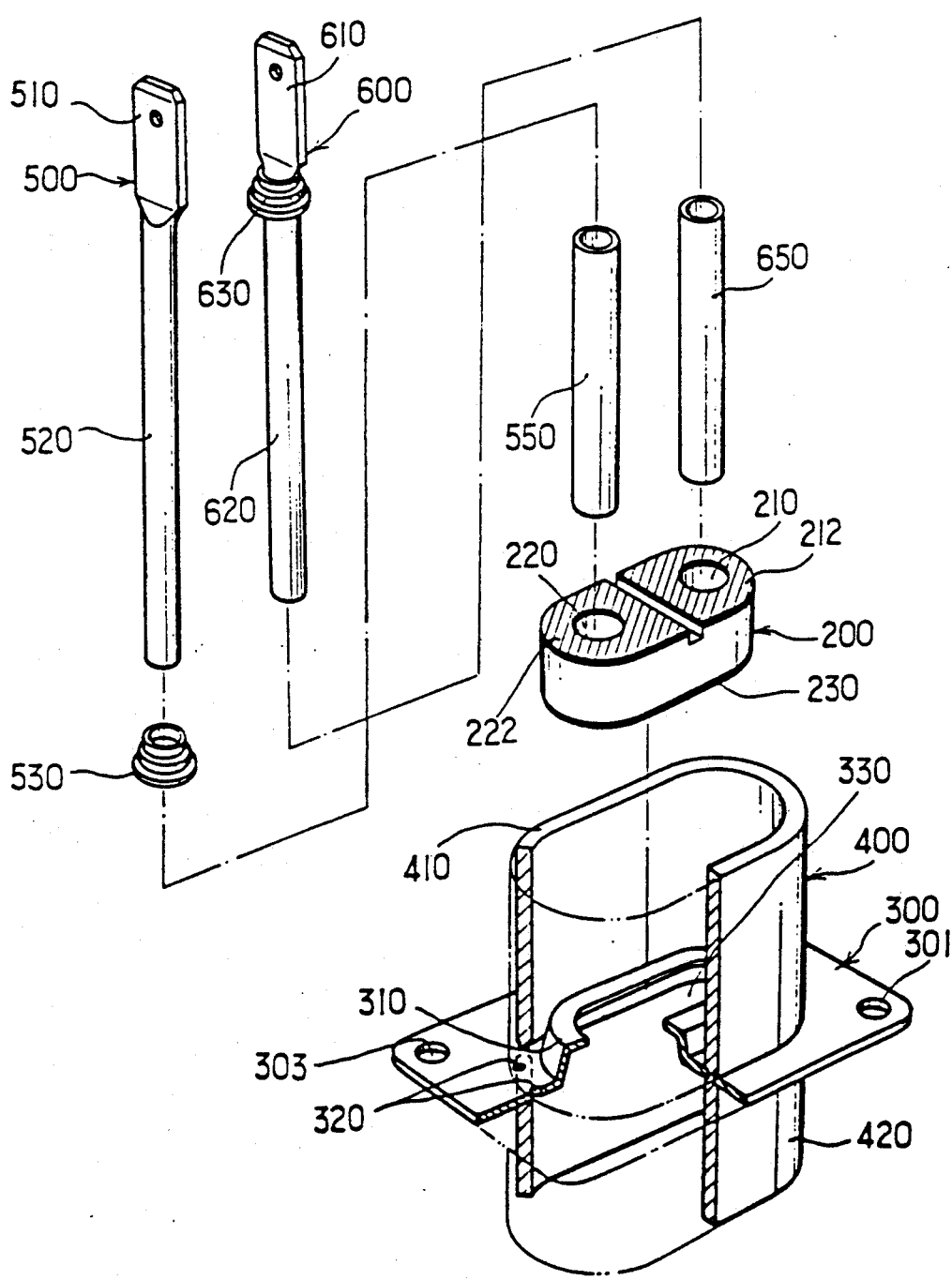
FIG. 6 is an exploded perspective view of a piercing through type capacitor according to a preterred embodiment of the present invention.
Figure 7:
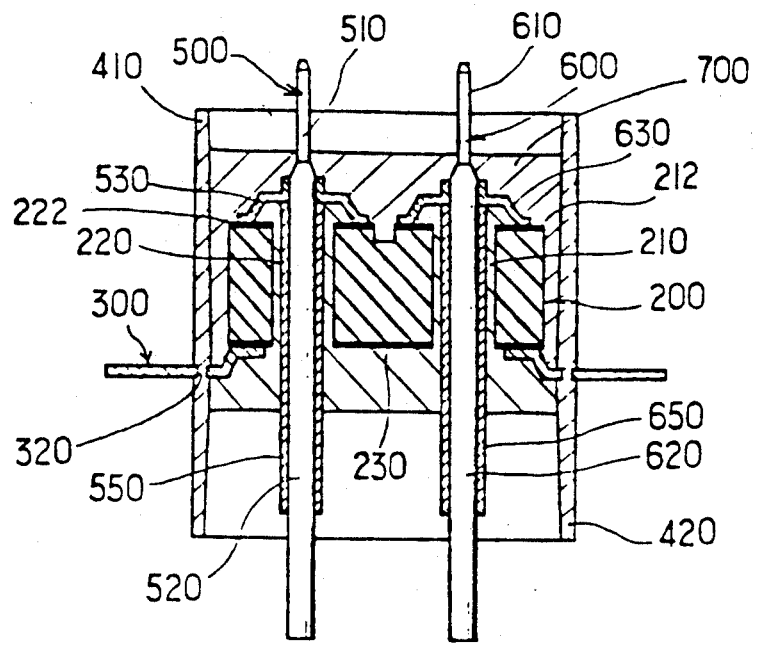
FIG. 7 is a vertical cross sectional view of FIG. 6, FIGS. 8(A), (B) are a detailed plane view (8A) of grounding plate of the present invention, and a vertical cross sectional view (8B) taken along a line A—A of FIG. 8A.

FIG. 6 and 7 are diagrams for showing a structure of piercing through type capacitor according to a preferred embodiment of the present invention, wherein FIG. 6 is an exploded perspective view of a capacitor, and FIG. 7 is a vertical cross sectional view of FIG. 6.

In said FIGS. 6 and 7, elliptic ceramic disc 200 of column type structure has a pair of piercing through holes 210, 220 over its thickness.

A pair of separated surface electrodes 212, 222 having respectively corresponding piercing through holes are provided on the top surface of said ceramic disc 200, and a common surface electrode 230 having corresponding piercing through holes is provided at its bottom surface.

Grounding plate 300 is structured in such a manner that ceramic disc 200 locating surface 310 of elongated oval shape formed with semicircle in both ends with flat surface is protruded to upward, and a number of piercing through small holes 320 are perforated along the end surface portion of insulation case 400 of elongated oval shape formed with semicircle in both ends.

Said locating surface 310 is contacted with the common surface electrode 230 of said ceramic disc 200.

Said grounding plate 300 has four fixing holes 301-304 for fixing the capacitor by utilizing suitable fixing means of screw or rivet and the like.

Said insulation case 400 is made to elongated oval shape in cross section formed with semicircle in both ends so as to be communicated with piercing through small holes 320 of said grounding plate 300, and it is molded by injecting integrally with said grounding plate 300 so as its upper case 410 and lower case 420 to have linear cross section.

A pair of piercing through conductors 500, 600 are formed along with a pair of piercing through holes 210, 220 of said ceramic disc 200.

Said piercing through conductors 500, 600 are formed respectively with flat terminals 510, 610 and piercing bars 520, 620, and metal caps 530, 630 are respectively fixed to the upper ends of said piercing through bars 520, 620 by soldering or welding and the like.

Said metal caps 530, 630 are adhered respectively with the surface electrodes 222, 212 of said ceramic disc 200.

Said piercing through conductors 500, 600 are inserted respectively to the piercing through holes 220, 210 of said ceramic disc 200 and to the elliptic opening 330 of the grounding plate 300.

Diameters of the piercing through holes 220, 210 of said ceramic disc 200 are bigger than the diameters of the piercing through bars 520, 620 of said piercing through conductors 500, 600. Hole diameters of said metal caps 530, 630 are equal to or slightly smaller than the diameters of the piercing through bars as much as a degree to be forcible inserting fit and then to be welded.

Said piercing through bars 520, 620 are respectively covered by insulation tubes 550, 650 such as silicone resin.

Top ends of said insulation tubes 550, 650 are contacted respectively to horizontal inner surface of said metal caps 530, 630.

Bottom ends of said insulation tubes 550, 650 are formed equal to or slightly shorter than the bottom end of said insulation case 420, and it does not matter if it is formed slightly longer.

And when the assembling of piercing through type capacitor is completed, it is molded by filling a insulation resin material 700 such as epoxy resin from the upper and lower portion of the insulation case 400.

Figure 8A:
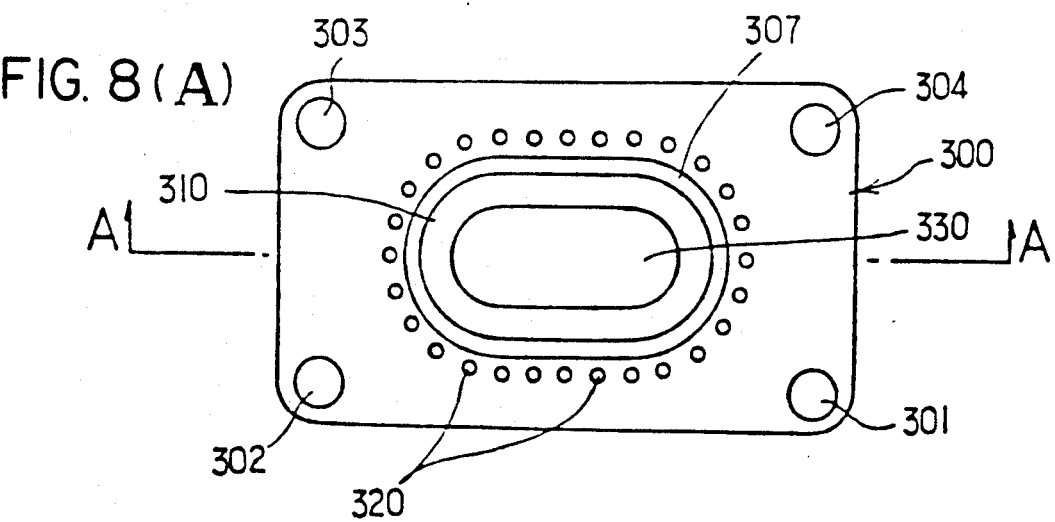
Figure 8B:

FIGS. 8(A), (B) show a plane view (8A) of said grounding plate 300, and a cross sectional view (8B) taken along a line A—A of FIG. 8(A).

Wherein slant slope 307 is formed between the grounding plate 300 plane and the locating surface 310.

Diameters of right and left semicircle of said elongated elliptic opening 330 are formed equal to or slightly bigger than the diameter of piercing through holes 210, 220 of said ceramic disc 200.

Figure 9:
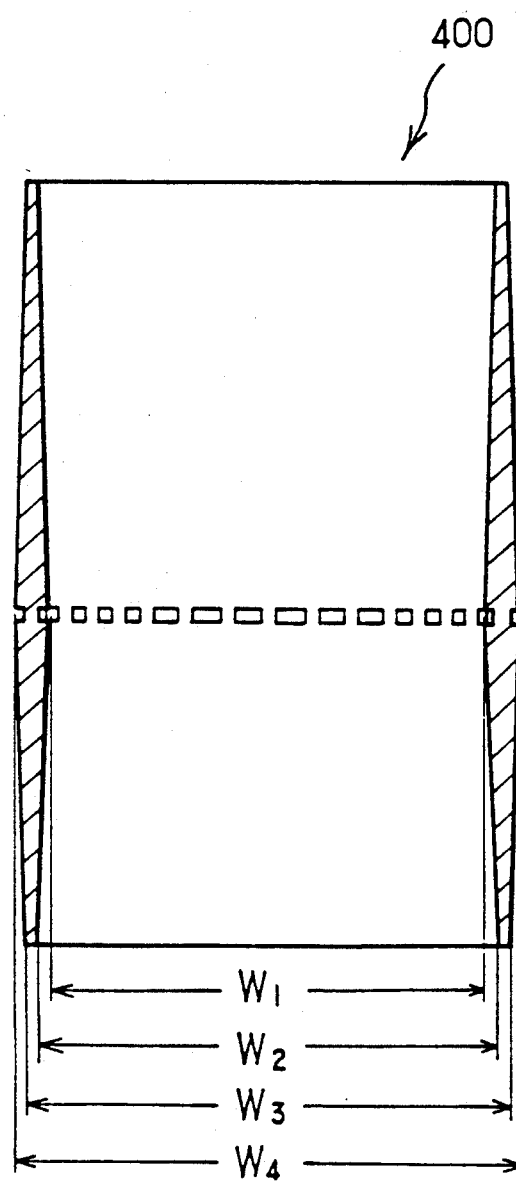
FIG. 9 is a vertical cross sectional view for showing a state that integral type insulation case according to a preferred embodiment of the present invention is made with tapering (slant)

FIG. 9 is a vertical cross sectional view for showing a state that the integral type insulation case of the present invention is tapered (inclined).

Wherein W1 is innermost diameter of the insulation case 400, and the grounding plate 300 is connected and fixed here.

W2 is inner diameter of both ends of the insulation 400, and W3 is outer diameter of both ends of the insulation case 400.

W4 is outermost diameter of the insulation case 400, and as described above, the grounding plate 300 is connected and fixed to here.

Figure 10:
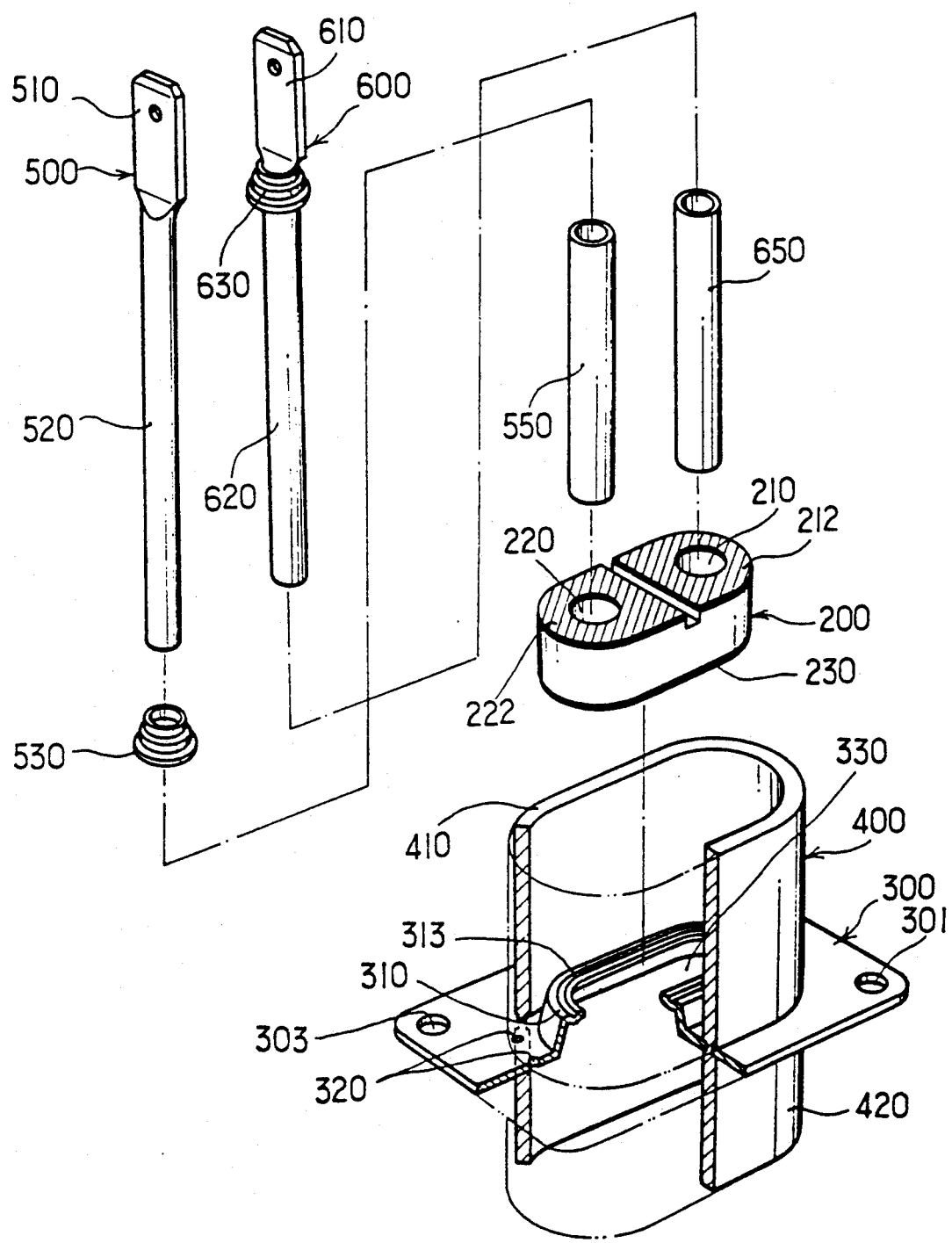
FIG. 10 is an exploded perspective view of a piercing through type capacitor according to the second embodiment of the present invention.
Figure 11:
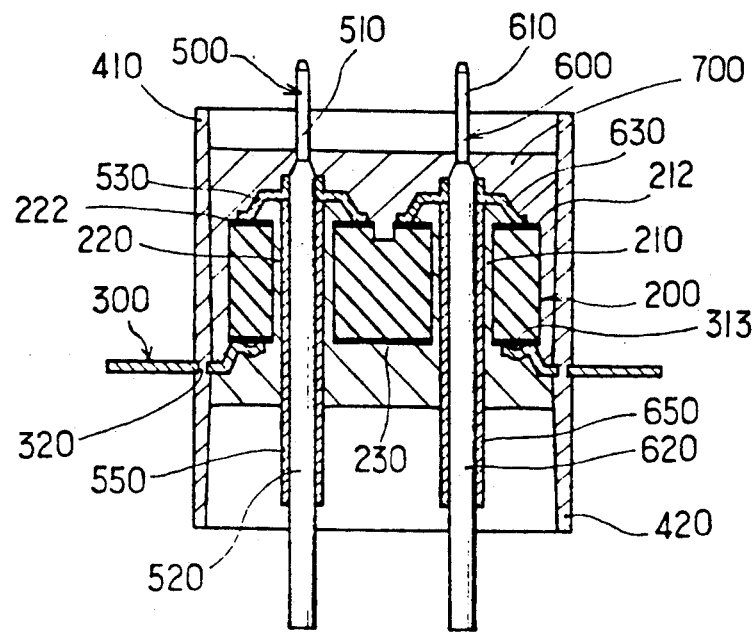
FIG. 11 is a vertical cross sectional view of FIG. 10, FIGS. 12(A) and (B) are a detailed plane view of grounding plate according to the second embodiment of the present invention (12A), and a vertical cross sectional view taken along a line B—B of FIG. 12(A) (12B)
Figure 12:
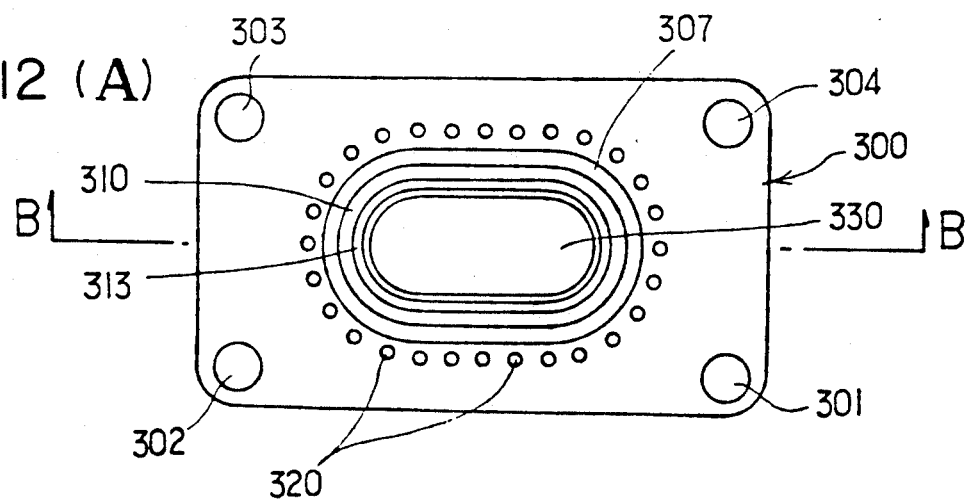
Figure 12:
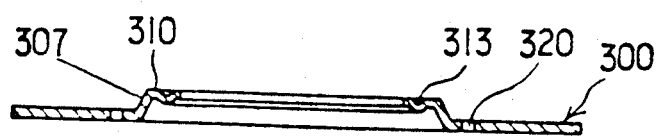

FIGS. 10, 11 and 12 show the second embodiment of the present invention.

In below drawings, same reference symbols or numerals are used for same parts or members as in the drawings of aforementioned embodiment.

Major characteristic of said second embodiment is that semicircular groove 313 is formed on the locating surface 310 of said ceramic disc 200, Radius of said groove 313 is determined with its magnitude according to the requirement so as wire solder to be laid therein.

After the wire solder is laid along said groove 313, said ceramic disc 200 is laid on it, and then they are heated at a temperature of 390° C.–410° C. by utilizing high frequency wave induction heating or electric furnace.

Then, the wire solder laid into said groove 313 is melted and soldering is carried out with said ceramic disc 200 whereby being adhered and fixed.

Figure 13:
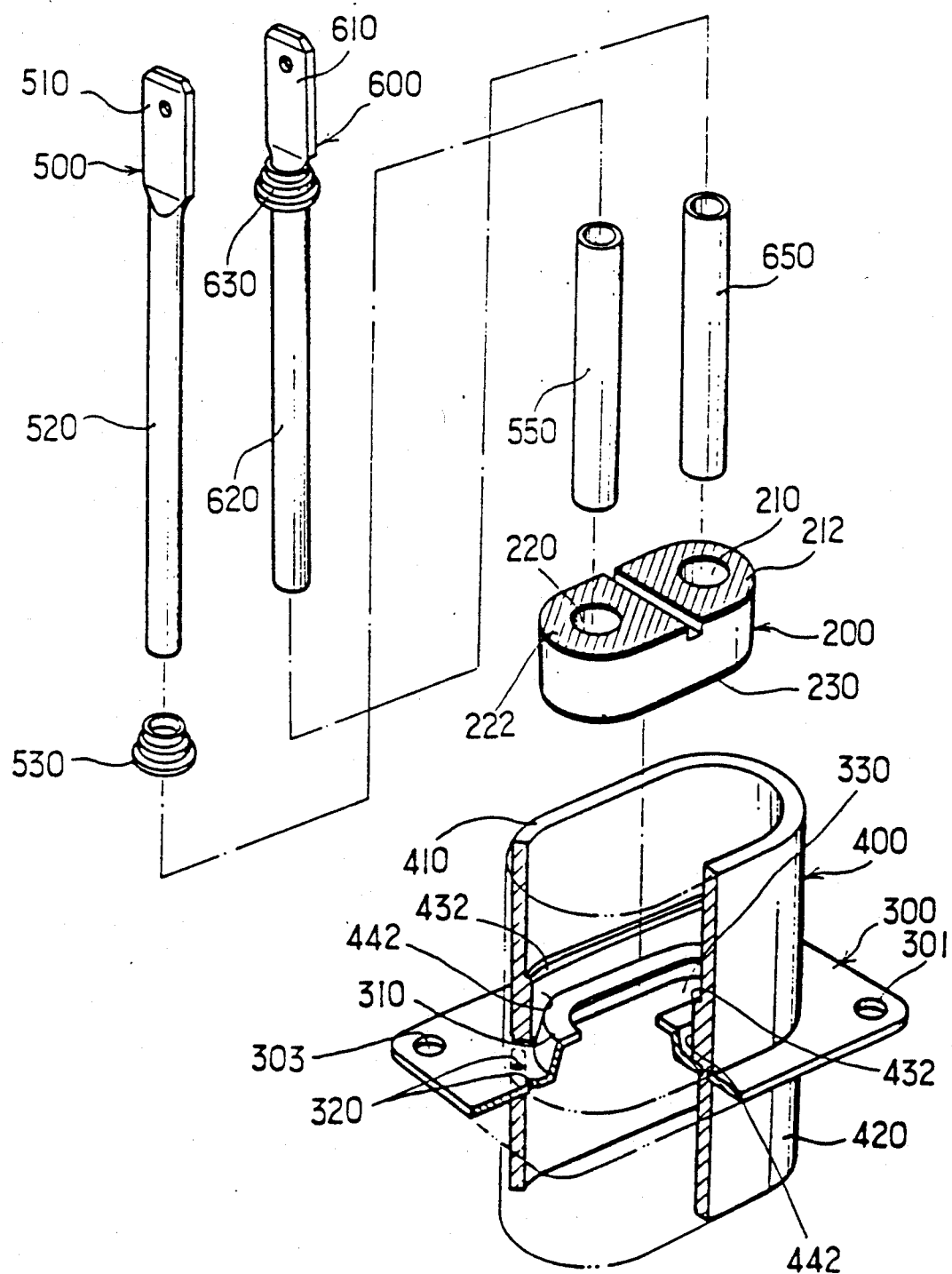
FIG. 13 is an exploded perspective view of a piercing through type capacitor according to the third embodiment of the present invention.
Figure 14:
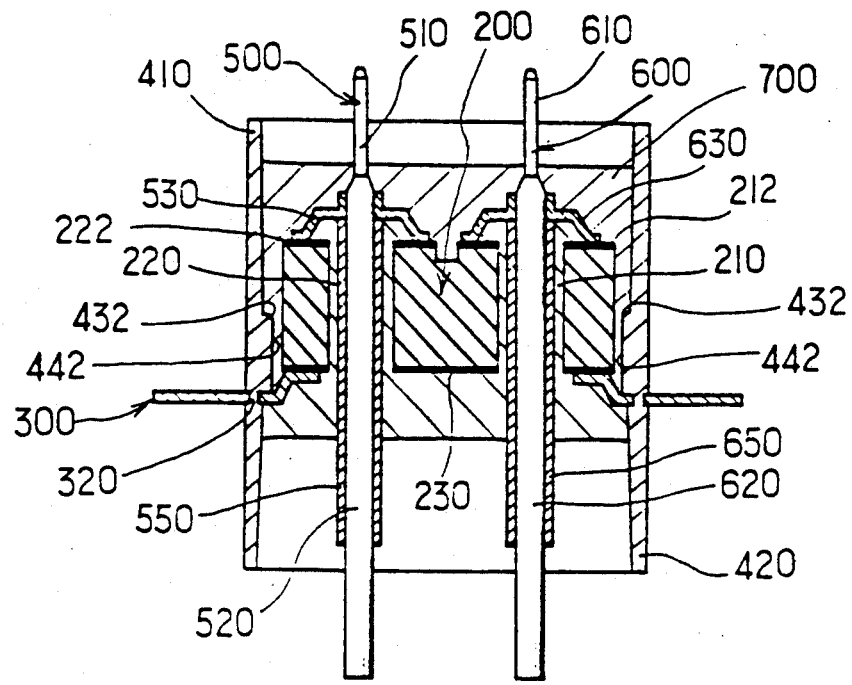
FIG. 14 is a vertical cross sectional view of FIG. 13.

FIGS. 13 and 14 show the third embodiment of the present invention.

In these drawings, same reference symbols or numerals are used for same parts or members as in the drawings of aforementioned embodiments.

Essential characteristic shown in said FIGS. 13 and 14 is that guiding slant means 432 for guiding said ceramic disc 200 to inner side elliptic opening of the insulating case 400 and contacting means 442 for contacting with side surface of the ceramic disc 200 are formed to the inner elliptic opening of the insulation case 400.

The ceramic disc 200 is stably guided by said guiding slant means 432, and the ceramic disc 200 becomes located to correct position by said contacting means 442.

And, said guiding slant means 432 and the contacting means 442 are formed to be protruded so that the ceramic disc 200 is correctly guided and then located and fixed upon locating and fixing the ceramic disc 200 to the locating surface 310 of the grounding plate 300 and therefore positioning deviation according to the leaving from position of the ceramic disc 200 is prevented and thereby there is no worry about producing electrical short circuit phenomenon of the capacitor.

Figure 16:
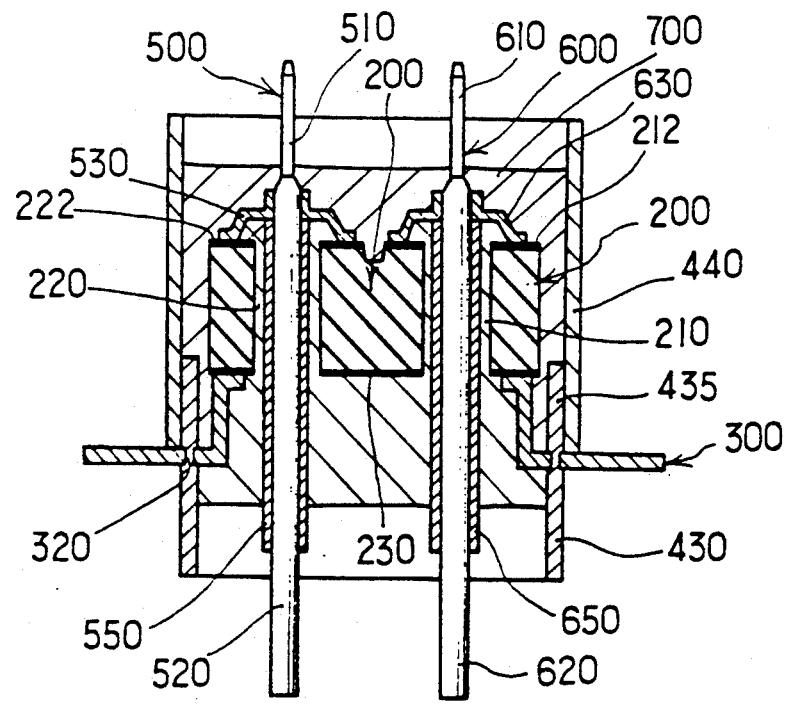
FIG. 16 is a vertical cross sectional view of FIG. 15.
Figure 15:
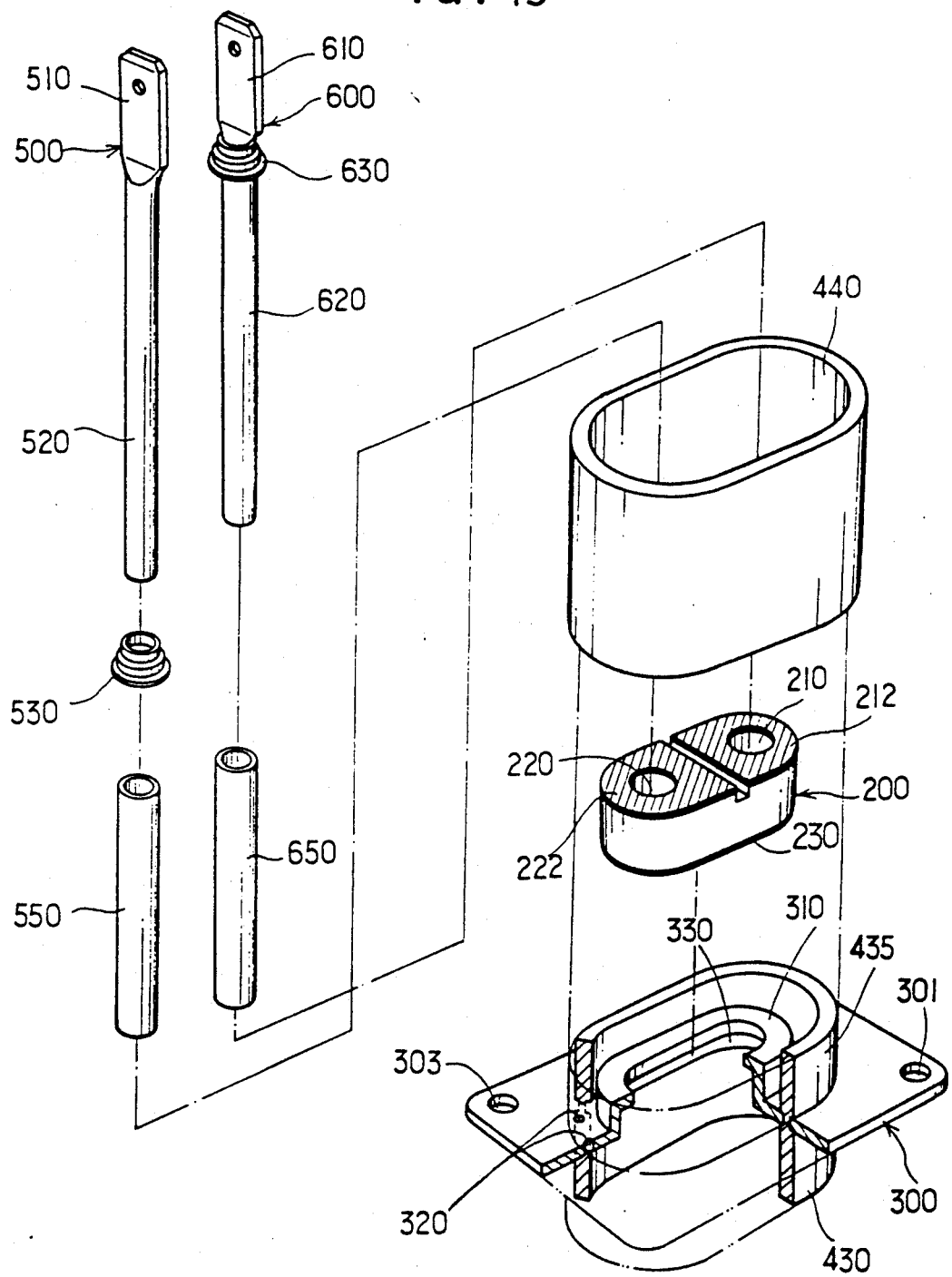
FIG. 15 is an exploded perspective view of a piercing through type capacitor according to the fourth embodiment of the present invention.

FIGS. 15 and 16 show the fourth embodiment of the present invention.

Essential characteristic exemplified in here is a structure that the grounding plate 300 and lower insulation case 430 are integrally formed, and inner surface of the insulation case 440 is inserted and covered to outer surface of upper part 435 of the lower insulation case 430 based on said grounding plate 300.

The upper part 435 of said lower insulation case 430 is extended by protruding to upward to be slightly higher than the height of the locating surface 310 of the grounding plate 300 through the piercing through holes 320 of the grounding plate 300.

Here, since the lower insulation case 430 and upper insulation case 440 are molded by injecting precisely by same material, there is none of worry about leaking of the epoxy insulation resin material 700 at the portion of coupling by inserting, and possibility for releasing of upper and lower insulation case is excluded.

Figure 17:
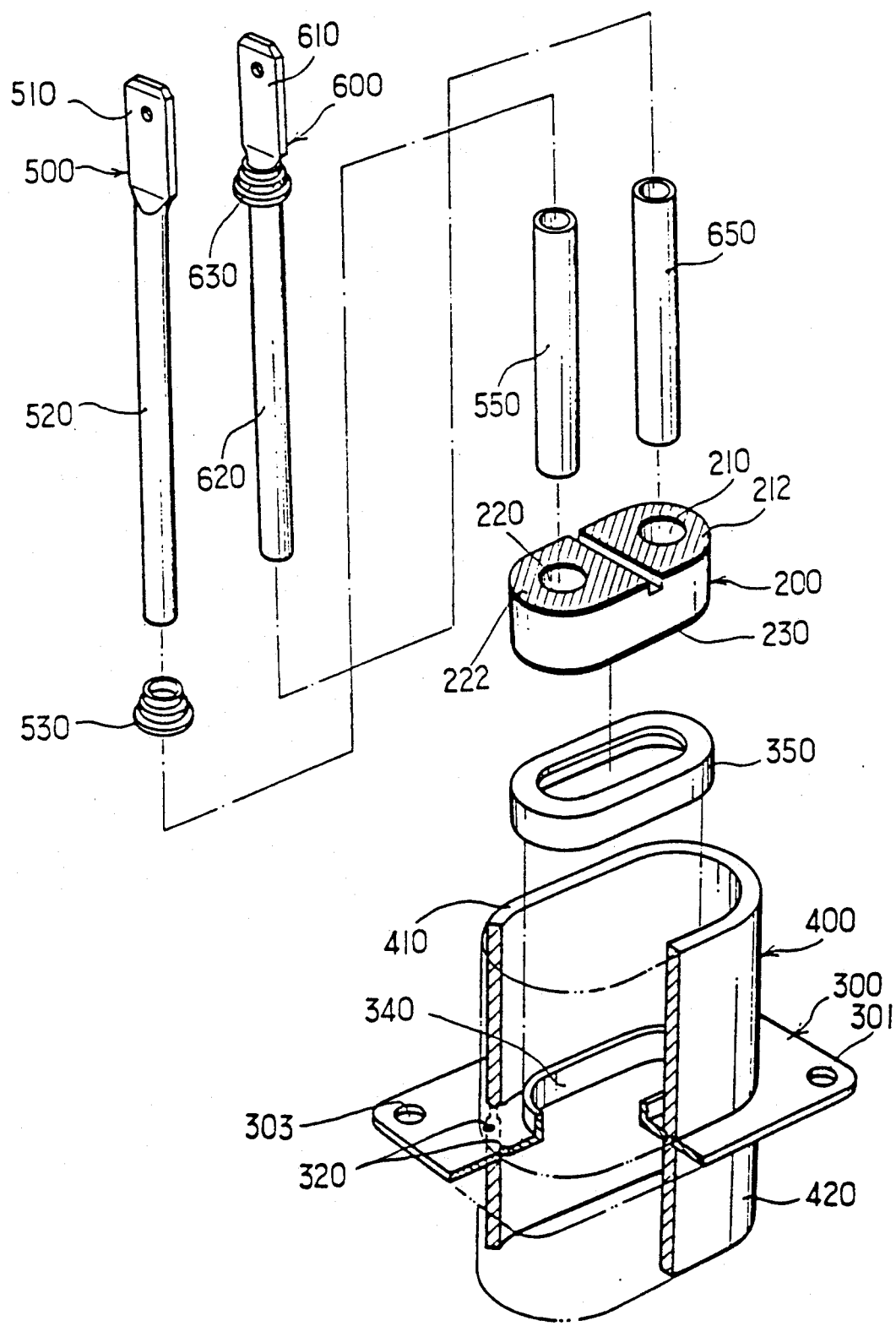
FIG. 17 is an exploded perspective view of a piercing through type capacitor according to the fifth embodiment of the present invention.
Figure 18:
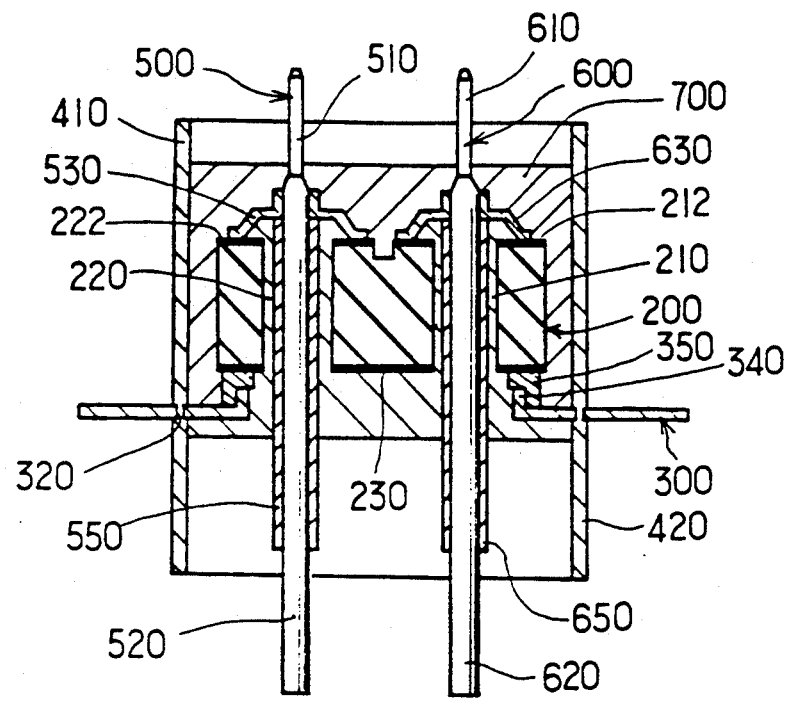
FIG. 18 is a vertical cross sectional view of FIG. 17.

FIGS. 17 and 18 show the fifth embodiment of the present invention.

Essential feature exemplified in here is that flange 340 which is made in flat and elliptic in both ends is formed by protruding to upward at the central portion of the grounding plate 300 which is made integrally with the upper insulation case 410 and lower insulation case 420, and grounding electrode 350 of ring type formed with "7" shape in its cross section is formed so as to forcibly be inserted and coupled to the flange 340 of said grounding plate 300.

Said grounding plate 300 is made from a metallic conductive material of weak magnetic material or non-magnetic material, and the grounding electrode 350 is made from a metallic conductive material of strong magnetic material.

In the fifth embodiment constructed as these, a ring type grounding electrode 350 is coupled by forcibly inserting to the flange 340 of the grounding plate 300, and the metal cap 530 of magnetic material to be contacted to the ceramic disc 200 and the metallic piercing through conductors 500, 600 of weak magnetic material or non-magnetic material are conductively connected and thereafter these are respectively contacted with solder placed on the separated surface electrodes 212, 222 and the common surface electrode 230 of the ceramic disc 200 and then they are heated by high frequency induction heating.

Here, the strong magnetic material may be, for example, iron or nickel, and weak magnetic material may be, for example, copper.

At this moment, the metal cap 530 and the grounding electrode 350 made from strong magnetic material are heated by induction heating and according to this, the solder is melted whereby said metal cap 530 and the ceramic disc 200 as well as the grounding electrode 350 are conductively connected and fixed.

Since thus the solder heated upon high frequency wave induction heating is instantaneously melted down, simple manufacturing condition can be obtained on manufacturing process, and according to this, improvement of working efficiency and productivity can be expected.

Figure 19:
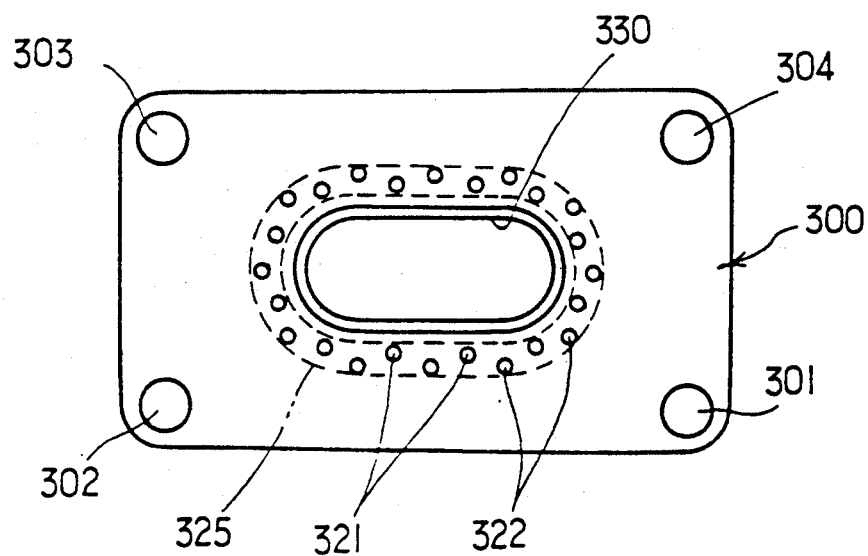
FIG. 19 is a plane view of another example of the grounding plate of the present invention, FIGS. 20(A), (B) are perspective views of piercing conductors according to the sixth embodiment of the present invention, FIGS. 21(A), B) are cross sectional views of changed portions of FIGS. 20(A), (B), FIGS. 22 (A), (B) are an exploded perspective view (22A) of piercing conductor according to the seventh embodiment of the present invention, and a vertical cross sectional view (12B) of its coupled state, FIGS. 23(A), (B) are an exploded perspective view (23A) of piercing conductor according to the eighth embodiment of the present invention, and a longitudinal half cross sectional view (23B) showing its coupled state, FIGS, 24s are diagrams for illustrating a manufacturing process of piercing conductor according to the ninth embodiment of the present invention, FIGS. 25(A), (B) are an exploded perspective view (25A) of a piercing conductor according to the tenth embodiment of the present invention, and a longitudinal half cross sectional view (25B) showing its coupled state.

FIG. 19 shows another example of the grounding plate 300 of the present invention, wherein the grounding plate 300 is provided with piercing through holes 321, 322 for cohering said insulation case 400 in zigzag form within the integral type insulation case 400 forming region 325 around the elliptic opening 330.

According to this, since coherence of the integral type insulation case 400 is increased through said zigzag type piercing through holes 321, 322 when the insulation case 400 is integrally molded around said grounding plate 300, contact of the insulation case 400 with said grounding plate 300 becomes perfect and thereby leaking phenomenon can be prevented upon filling the epoxy resin 700 into the interior space of the capacitor.

Therefore, when the piercing through type capacitor is manufactured by utilizing the grounding plate of the present invention, not only badness producing rate and quality causing from leaking out to exterior of epoxy resin can be minimized, but also mechanical strength of the piercing through type capacitor can be increased according to the increase of coherence of said integral type insulation case.

FIGS. 20(A), (B) and 21(A), (B) show the sixth embodiment of the present invention.

Essential feature exemplified here is that top ends of the piercing through conductors 500, 600 are formed to flat terminal by a pressing operation, and deformed portion capable of surely fixing the metal cap to the piercing through bar below the top end is provided.

In FIG. 20(A) of the sixth embodiment, the piercing through conductor 500, 600 is structured in such a manner that the piercing through bar 520 made of circular column form is provided, and top end of this piercing through bar 520 is formed to flat terminal 510 by a pressing operation, and deformed portion 525 for inserting and fixing of metal cap 530 and for sure fixing position setting to a predetermined position of the piercing through bar 520 of immediately below end of this flat terminal 510 is provided. Said deformed portion 525 is formed with major axis a and minor axis b, and it may be made of elliptic shape in cross section as shown in FIG. 21(A), or it may be made of deformed circular shape in cross section having two parallel flat surface as shown in FIG. 21(B).

And, ratio (b/a) of the major axis a to minor axis b of said deformed portion 525 is made to about 0.6–0.98.

FIG. 20(B) shows another example for showing the deformed portion 525 of the piercing through conductor 500, 600, wherein this piercing through conductor may be provided with position fixing portion 527 formed with concave and convex of linear shape by pressing toward circumferential direction only for the fixing position setting.

In the sixth embodiment constructed as these, when the metal cap 530 of cylindrical cap shape is inserted and pushed from bottom end of the piercing through bar 520 of the piercing through conductor 500, 600 to upward, the metal cap 530 is inserted and fixed whereby fixing position setting is made at the deformed portion 525 of the piercing through bar 520.

And, in case when sure fixing position setting is required to a predetermined position of the piercing through bar 520 of the piercing through conductor 500, 600, a piercing through conductor 501 having a position fixing portion 527 at the piercing through bar 520 is used.

In the sixth embodiment as described above, the piercing through conductor 500 is provided in which the flat terminal 510 and the piercing through bar 520 are integrally formed by one single material and the deformed portion 525 is formed to the piercing through bar 520 of immediately below end of the flat terminal 510, so that soldering process which has been indispensable process in the conventional piercing through conductor is not required and thereby manufacturing cost is decreased.

And further, in case of inserting and fixing the metal cap 530 to the piercing through bar 520 of the piercing through conductor 501, fixing is made only by inserting whereby soldering process is not required as well, and sure fixing position setting can be carried out by the position fixing portion 527 of the piercing through bar 520.

FIGS. 22(A), (B) show the seventh embodiment of the present invention, and FIG. 22(A) is an exploded perspective view of the piercing through conductor, and FIG. 22(B) is a cross sectional view for showing its assembled state.

Essential feature in here is that it is made by a structure in which the flat terminal 510 and the piercing through bar 520 of the piercing through conductor 500, 600 and the metal cap 530 are inserted by pressure.

In said seventh embodiment, the piercing through conductor 500 is constructed in such a manner that assembling short piece 512 is extented from the bottom end of the flat terminal 510, the piercing through bar 520 is formed with inserting hole 532 to be inserted and fixed with the assembling short piece 512 of said flat terminal 510 at top end of the piercing through bar 520 of circular bar shape as well as the metal cap 530 of cylindrical cap form to be contacted on the electrode surface of the ceramic disc 510.

Said inserting hole 532 and the metal cap 530 of the piercing through bar 520 are automatically molded by forging machine.

And, the forms of the assembling short piece 512 of said flat terminal 510 and the inserting hole 532 of the piercing through bar 520 are made in rectangular shape, but they may also be made to other form than this, for example, to circular form or hexagonal form.

Thus, the assembling short piece 512 of the flat terminal 510 is inserted into the inserting hole 532 of the piercing through bar 520 whereby it is either fixed by solding or fixed by inserting by pressure with forcible insertion coupling, so that the piercing through conductor 500 of finished product is obtained.

Therefore, according to the piercing through conductor 500 having flat terminal and function of the piercing through bar and metal cap, the number of parts and assembling process are decreased and working efficiency and productivity are improved.

And, since there is no worry about poor adherence or slant adhering upon assembling, assembling error is decreased, and in case of using by assembling to the piercing through type capacitor, even if heater power supply of magnetron is applied to the piercing through conductor, none of worrying about electric discharge is present and therefore reliability of product is improved.

Figure 23A:
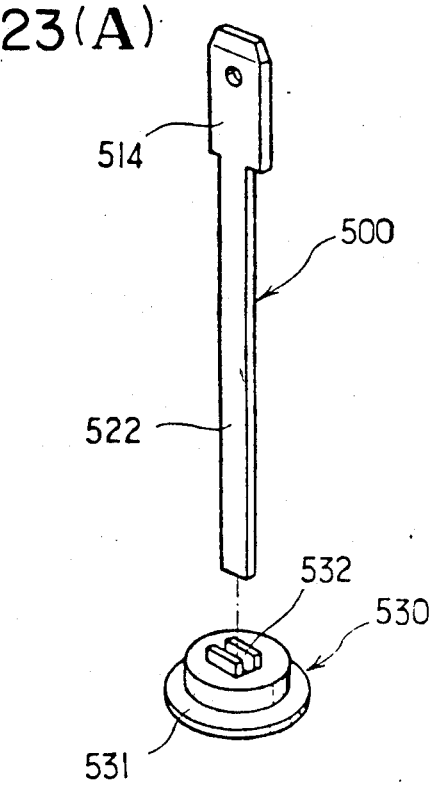
Figure 23B:
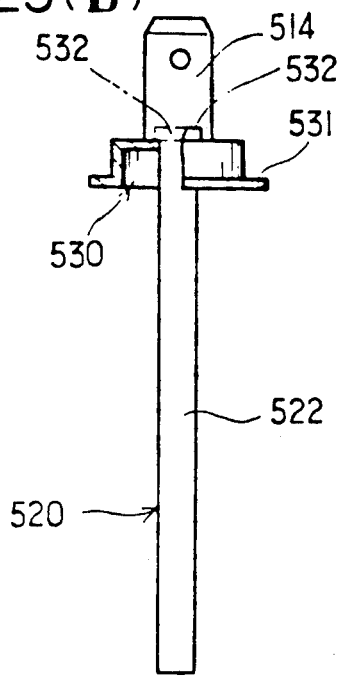

FIGS. 23(A), (B) show the eighth embodiment of the present invention, wherein FIG. 23(A) is an exploded perspective view of the piercing through conductor, and FIG. 23(B) is a cross sectional view for showing its assembled state.

Essential feature in here is to construct the piercing through conductor made by one flat plate member, and metal cap which is inserted to the piercing through strip bar of said integral body type piercing conductor.

In said eighth embodiment, the piercing through conductor 500 is structured in such a manner that flat terminal 514 and piercing through strip bar 522 are made by flat plate of same thickness, and metal cap 530 is formed with flange 531 at bottom end, and vertical short pieces 532 are provided at top end of cylindrical cap body so as to surround and grip both side surfaces of said piercing through strip bar 522.

The metal cap 530 is inserted from the bottom end of the piercing through strip bar of the piercing through conductor 500 so as the vertical short pieces 532 of the metal cap 530 to surround both side surfaces of the piercing through strip bar 522 whereby it is fixed by soldering at predetermined position.

Therefore, the metal cap 530 is simply fixed by soldering without inclining to the piercing through strip bar 522 of the piercing through conductor 500 whereby assembling error is decreased. And, since there is no worry about poor adherence or slant adhere of the metal cap 530 and the piercing through conductor 500 upon assembling, their assembling error is decreased to minimum, and since there is no worry about electric discharge between the piercing through conductor 500 and the grounding plate 300 in case of using to the piercing through type capacitor as well, reliability of the product is improved.

FIG. 24s show the ninth embodiment of the present invention.

Essential feature in here is the structure that flat terminal and metal cap as well as cylindrical bar are integrally molded.

According to the manufacturing process of the piercing through conductor 500 of said ninth embodiment, round bar raw material 521 is cut to a predetermined length, and said round bar raw material 521 is pressed up by small diameter from the bottom end so that piercing through bar 524 and disc type flange 534 are formed and thereafter metal cap 535 of cylindrical cap form is formed by pressing, and flat terminal 515 is formed by pressing also the top end of the round bar raw material 521, so that the piercing through conductor 500 of the present invention is obtained.

Thus, in the piercing through type capacitor, one piercing through conductor 500 having the piercing through conductor and metal cap is provided, so that the number of parts and manufacturing process are decreased.

And, since there is no worry about poor adherence or slant adhere upon assembling, assembling error is decreased, and since the piercing through conductor 500 is structured by one single body, contacting portion is decreased and thereby electrical conductivity becomes better, so that characteristic of the piercing through type capacitor is improved.

FIGS. 25(A), (B) show the tenth embodiment of the present invention wherein FIG. 25(A) is an exploded perspective view of the piercing through conductor, and FIG, 25(B) is a cross sectional view of its assembled state.

Essential feature in here is that metal cap of the piercing through conductor and flat terminal are integrally formed.

In said tenth embodiment, terminal portion 540 is made by plate material, wherein flat terminal 541 is formed at top and metal cap 537 of cap form perforated with piercing through bar hole 543 at its bottom is integrally formed so as to make inverse "T" shape. The piercing through bar portion 525 is a wire of cylindrical form.

Thus, the piercing through bar portion 525 is inserted into the piercing through bar hole 543 perforated at the metal cap 537 of said terminal portion 540 and then their coupling portion is soldered or welded, so that the piercing through conductor of finished piercing type capacitor is obtained.

Figure 27:
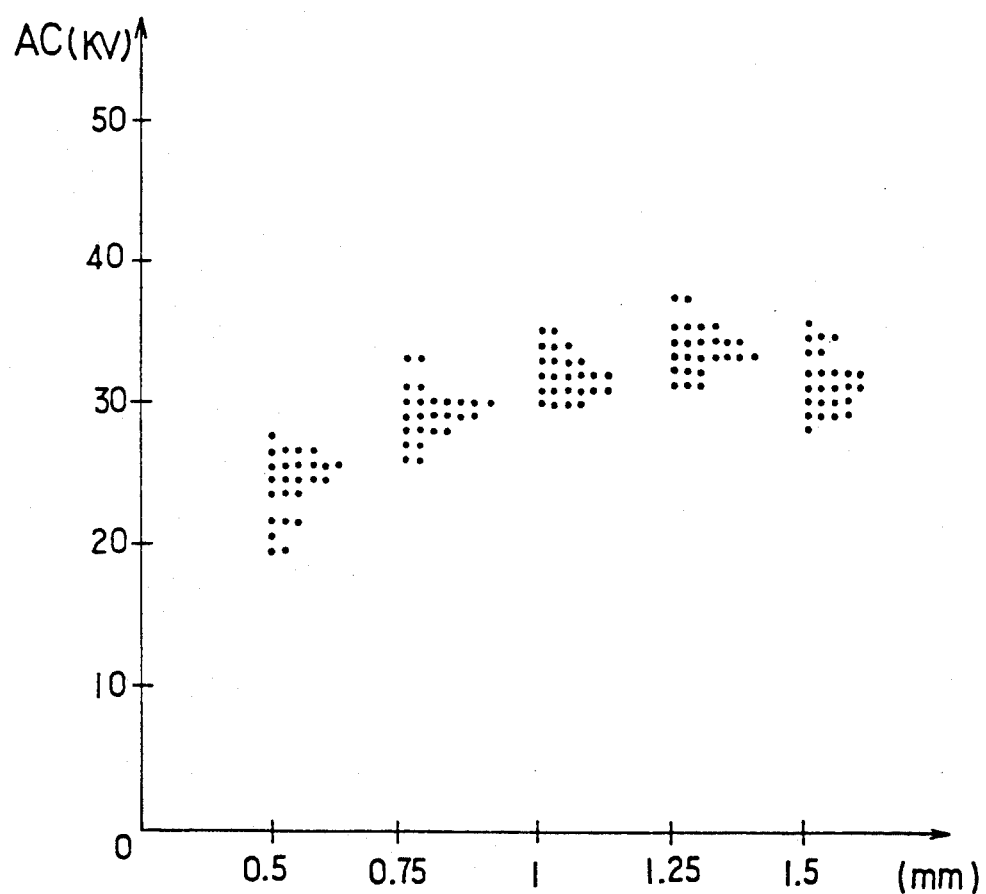
FIG. 27 is a graph for showing characteristics of insulation breaking down voltages according to the distance and depth of electrode insulation in FIG. 26.

FIGS. 26 and 27 shown the eleventh embodiment of the present invention.

Essential feature in here is that groove of inverse trapezoidal shape is formed by electrode insulating gap, depth and internal surface distance between two electrodes on the top surface of ceramic disc 200.

Groove 240 of inverse trapezoidal shape is formed between two top surface electrodes 212, 222 of said ceramic disc 200, wherein this is formed by electrode insulating gap G, depth D and internal surface distance s.

It is desirable that the electrode insulating gap G and depth D of said ceramic disc 200 are maintained to 1-1.5 mm and the internal surface distance S is to be $S = G/(1.35-1.45)$ mm.

Said reason is because, as shown in FIG. 27, as a result that the electrode insulating gap G and depth D are respectively changed with same value and the internal surface distance S is changed by same rate and then insulating is maintained by insulation resin material and insulation break down voltage is measured, it was most stable against unstable input terminal voltage and insulation break down endurance was high therefore the ceramic disc of higher reliability can be obtained.

Said FIG. 27 is a graph in case when X axis is electrode insulating gap G and depth D, and condition in here is G=D.

Y axis represents insulating break down voltage.

The voltage in here is AC voltage and its unit is KV.

Particularly, when said electrode insulating gap G and depth D are 1.15-1.35 mm and the internal surface distance S is 0.8-1.0 mm, highest insulating break down voltage could be obtained.

And, in adhering of the ceramic disc 200 and the insulation resin material 700 as well, when the ratio between the electrode insulating gap G and the internal surface distance S was S=G/(1.35-1.45), highest insulation break down endurance could be recognized.

As describe above, by providing the ceramic disc 200 formed with inverse trapezoidal groove 240 according to the electrode insulating gap G and depth D as well as internal surface distance S between two top surface electrodes 212, 222, break down path produced at adjacent of the top surface electrodes of the ceramic disc is prevented by concentration of electric field operated to the ceramic disc and insulation break down endurance difference of the ceramic disc 200 and insulation resin material 700, and high voltage piercing through type capacitor in which ensulation break down endurance is high and most stable against unstable input terminal voltage can be obtained.

On the other hand, the epoxy insulation resin material 700 can be designed to upper and lower insulation resin materials around the metal cap 530 and other insulation resin material, and said upper and lower insulation resin materials are made by an insulation resin material in which Shore hardness Hs is less than 50 and heat deformation temperature T is under 30° C., and said other insulation resin material is that an insulation resin material is molded with predetermined thickness in which Shore hardness is about 78-82 and heat deformation temperature T is about 58° C.-62° C.

Since the Shore hardness and heat deformation temperature of said upper and lower insulation resin material are low, the upper and lower insulation resin material layers can not give sufficient mechanical strength to the piercing through conductors 500, 600, excellent anti-pressure characteristic is given upon heat cycle testing by physical property of the upper and lower insulation resin materials, and mechanical strength of the piercing through conductor which is not given by the upper and lower insulation resin material becomes to be given by other insulation resin material that Shore hardness and heat deformation temperature are high.

As another embodiment of said insulation resin material 700, said upper and lower insulation resin materials are filled by same physical property epoxy resin that Shore hardness is 75-85, heat deformation temperature is 45° C.-55 C., and anti-arc characteristic is over 120 sec.

As described above, high voltage piercing through type capacitor is provided in which the upper and lower insulation resin materials are filled by an insulation resin material that Shore hardness Hs and heat deformation temperature T are low, and other insulation resin material is molded to upper end of said upper and lower insulation resin materials that Shore hardness Hs and heat deformation temperature T are high, so that it has excellent anti-pressure characteristic in heat cycle testing which is one of reliability heat and sufficient mechanical strength is given to the piercing through conductor as well.

We claim:

1. Piercing through type capacitor which is comprised of:
    a ceramic disc having separated two electrodes on a top surface and a common electrode on a bottom surface;
    a grounding plate which includes an elongated oval protuberance having a large elliptic passing through an opening at a central portion wherein said ceramic disc is positioned on said protuberance, and a number of other small piercing through holes in said grounding plate at a predetermined distance from said elongated oval protuberance;
    an insulation case of elliptic hollow column shape in which an upper portion of said insulation case is surrounding said ceramic disc through said other small piercing through holes over said grounding plate and wherein a lower portion and said upper portion of said insulation case are integrally made;
    a pair of piercing through conductors in which a pair of metal caps are fixed and which are respectively provided to each of said separated electrodes on said top surface of said ceramic disc and having protrusions around each periphery;
    a pair of insulating tubes covering each piercing through bar of said piercing through conductor; and
    epoxy insulation resin material filled within the interior of said insulation case,
    so that perfect sealing is formed due to integral body of said upper and lower portions of said insulation case and thereby preventing leakage of insulating resin material.

2. Piercing through type capacitor according to claim 1, wherein a semicircular groove is formed on a locating surface on top of said protuberance of said grounding plate so a wire solder can be laid thereon.

3. Piercing through type capacitor according to claim 1, wherein guiding slant means for guiding said ceramic disc and contacting means for contacting a side surface of said ceramic disc are formed on an internal wall of said integral type insulating case so as to prevent positional deviation according to the leaving of position of said ceramic disc.

4. Piercing through type capacitor according to claim 1, wherein a flange having an elongated oval opening is formed at said grounding plate and a ring type grounding electrode with a "⏋" shape in cross section is coupled to an external surface of said flange.

5. Piercing through type capacitor according to claim 4, wherein said grounding electrode is made from a magnetic material.

6. Piercing through type capacitor according to claim 1, wherein said other piercing through holes are provided in a zigzag configuration so that coherence of the grounding plate and the integral type insulation case in increased.

7. Piercing through type capacitor according to claim 1, wherein said epoxy resin material within said upper portion of said insulating case and within said lower portion of said insulation case is made from the same insulation resin material, and further including other insulation resin material separately filled and molded at a part of said upper portion of said insulation case.

8. Piercing through type capacitor according to claim 7 wherein
said epoxy resin material within said upper and lower portions of said insulating case is less than 50 in Shore hardness Hs,
and has a heat deformation temperature thereof under 30° C., and
said other insulating resin material has a Shore hardness Hs more than 80 and heat deformation temperature over 60° C.

9. Piercing through type capacitor according to claim 7, wherein
said epoxy resin material within said upper and lower portions of said insulation case has a heat deformation temperature within the range of 45° C.–55° C., has a Shore hardness Hs within the range of 75–85, and has an anti-arc characteristic over 120 sec upon depositing with epoxy resin.

10. Piercing through type capacitor according to claim 1, wherein said ceramic disc is formed with an inverse trapezoidal groove defining an electrode insulating gap G, depth D, and an internal surface distance S between said two separated electrodes on said the top surface of said ceramic disc.

11. Piercing through type capacitor according to claim 10 wherein said electrode insulating gap G of said groove is within the range of 1–1.5 mm.

12. Piercing through type capacitor according to claim 10, wherein the ratio of said internal surface distance S to said electrode insulating gap G is within the range of 1.35 to 1.45.

13. Piercing through type capacitor comprising:
a ceramic disc having separated two electrodes on a top surface and a common electrode on a bottom surface;
a grounding plate which is made with an elongated oval locating surface means on which said ceramic disc is positioned, an elliptic protuberance having a large elliptic piercing through an opening at a central portion, and a number of other small piercing through holes around said elliptic protuberance located at a predetermined distance from said protuberance;
an elongated oval insulating case which is structured with a lower portion of said insulating case formed integrally and extending through said other small piercing through holes of said grounding plate and an upper portion of said insulation case formed separately from said lower portion of said insulating case of an upper portion over said grounding plate;
a pair of piercing through conductors in which a pair of metal caps are fixed and which are respectively provided to each of said separated electrodes on said top surface of said ceramic disc and having protrusions around each periphery;
a pair of insulating tubes covering each piercing through bar of said piercing through conductor; and
epoxy insulation resin material filled within the interior of said insulating case.

14. Piercing through type capacitor comprising:
a ceramic disc having separated two electrodes on a top surface thereof and a common electrode on a bottom surface thereof;
a grounding plate which includes an elongated oval locating surface means upon which said ceramic disc is positioned, an elongated oval protuberance having a large elongated oval piercing through an opening at a central portion, and a number of other small piercing through holes around said elongated oval protuberance positioned at a predetermined distance therefrom;
an insulation case of elongated hollow oval column shape in which an upper portion of said insulation case surrounds aid ceramic disc through said other small piercing through holes over said grounding plate and wherein a lower portion and said upper portion of said insulating case are integrally made;
a pair of piercing through conductors each including a flat terminal and piercing through bar which are made with an integral body, and a deformed portion having a major axis a and minor axis b adjacent to said piercing through bar below said flat terminal to thereby fix a metal cap to said piercing through bar;
a pair of insulation tubes covering each said piercing through bar of said piercing through conductors; and
epoxy insulation resin material filled within the interior of said insulation case.

15. Piercing through type capacitor according to clam 14, wherein each said deformed portion is formed with an elliptic cross section or a circular cross section having two parallel flat surfaces thereof, and wherein the ratio of said major axis a and minor axis b is within the range of 0.6–0.98.

16. Piercing through type capacitor according to claim 14, wherein position fixing means are provided which are formed with concave and convex linear shape and are positioned below said flat terminal.

17. Piercing through type capacitor according to claim 14, wherein an assembling short piece is extended from the bottom of said flat terminal of said piercing through conductor, and an inserting hole for inserting said assembly short piece is formed at a top end of said piercing through bar with said flat terminal fixed by inserting said assembling short piece into said inserting hole of said piercing through bar.

18. Piercing through type capacitor according to claim 14, wherein said piercing through conductor is formed by a flat plate material forming said flat terminal and piercing through strip bar forming said piercing through bar, and said metal cap is cylindrical and formed with vertical short pieces at a top portion of said cap so as to surround said piercing through strip bar.

19. Piercing through type capacitor according to claim 14, wherein said piercing through conductor is formed integrally with said flat terminal, said metal cap, and said piercing through bar by forging.

20. Piercing through type capacitor according to claim 4, wherein said piercing through conductor and said metal cap are formed with an inverse "T" shaped terminal and a cylindrical piercing through bar.

* * * * *

UNITED STATES PATENT AND TRADEMARK OFFICE
CERTIFICATE OF CORRECTION

PATENT NO. : 5,142,436

DATED : August 25, 1992

INVENTOR(S) : Soo-Cheol Lee, Kwang-Hee Jung and Chi-Ho Kim

It is certified that error appears in the above-identified patent and that said Letters Patent is hereby corrected as shown below:

Cover page, under References Cited U.S. PATENT DOCUMENTS, insert "4,768,129 8/1988 Sasaki et al. ... 361/302".

Column 1 Line 34 "Cl" should read --C1--.

Column 2 Line 21 "vucanizing" should read --vulcanizing--.

Column 2 Line 23 "volcanized" should read --vulcanized--.

Column 2 Line 53 "valcanized" should read --vulcanized--.

Column 3 Line 40 "graounding" should read --grounding--.

Column 3 Line 43 "a" should read --an--.

Column 3 Line 60 "disty" should read --dusty--.

Column 3 Line 65 "is" should read --are--.

Column 4 Line 43 after "is" insert --invented to solve--.

UNITED STATES PATENT AND TRADEMARK OFFICE
CERTIFICATE OF CORRECTION

PATENT NO. : 5,142,436

DATED : August 25, 1992

INVENTOR(S) : Soo-Cheol Lee, Kwang-Hee Jung and Chi-Ho Kim

It is certified that error appears in the above-identified patent and that said Letters Patent is hereby corrected as shown below:

Column 4 Line 51 "remarkable" should read --remarkably--.

Column 4 Line 56 after "case" insert --to--.

Column 4 Line 68 "comprising :" should read --comprising:--.

Column 5 Line 33 "how" should read --now--.

Column 5 Line 34 "which :" should read --which:--.

Column 5 Line 45 "preterred" should read --preferred--.

Column 6 Line 14 "B)" should read --(B)--.

Figure 24:
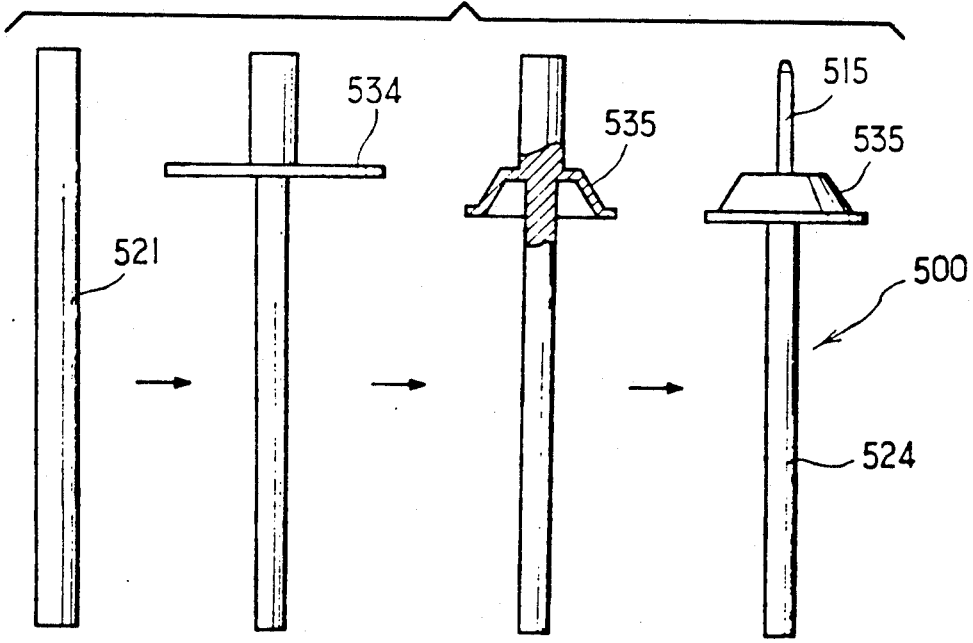

Column 6 Line 25 "FIGS, 24s" should read --FIGS. 24--.

Column 6 Line 49 "followings" should read --follows--.

Column 6 Line 50 "FIG." should read --FIGS.--.

UNITED STATES PATENT AND TRADEMARK OFFICE
CERTIFICATE OF CORRECTION

PATENT NO. : 5,142,436                                                            Page 3 of 5

DATED : August 25, 1992

INVENTOR(S) : Soo-Cheol Lee, Kwang-Hee Jung and Chi-Ho Kim

It is certified that error appears in the above-identified patent and that said Letters Patent is hereby corrected as shown below:

Column 7 Line 39 "520;" should read --520,--.

Column 7 Line 50 "a" should read --an--.

Column 11 Line 22 "solding" should read --soldering--.

Column 12 Line 4 "FIG. 24s" should read --FIGS. 24--.

Column 12 Line 64 "s" should read --S--.

Column 13 Line 5 "insulating" should read --insulation--. (first occ.)

Column 13 Line 13 "insulating" should read  --insulation--.

Column 13 Line 17 "insulating" should read --insulation--.

Column 13 Line 34 "ensulation" should read --insulation--.

Column 13 Line 64 "55 C." should read --55°C.--.

UNITED STATES PATENT AND TRADEMARK OFFICE
CERTIFICATE OF CORRECTION

PATENT NO. : 5,142,436

DATED : August 25, 1992

INVENTOR(S) : Soo-Cheol Lee, Kwang-Hee Jung and Chi-Ho Kim

It is certified that error appears in the above-identified patent and that said Letters Patent is hereby corrected as shown below:

Column 14 Line 7 "heat" should read --test--.

Claim 1 Line 34 Column 14 "insulating" should read --insulation--.

Claim 1 Line 41 Column 14 "insulating" should read --insulation--.

Claim 3 Line 51 Column 14 "insulating" should read --insulation--.

Claim 6 Line 65 Column 14 "in" should read --is--.

Claim 7 Line 1 Column 15 "insulating" should read --insulation--.

Claim 8 Line 7 Column 15 "claim 7" should read --claim 7,--.

Claim 8 Line 9 Column 15 "insulating" should read --insulation--.

Claim 8 Line 13 Column 15 "insulating" should read --insulation--.

Claim 13 Line 51 Column 15 "insulating" should read --insulation--.

UNITED STATES PATENT AND TRADEMARK OFFICE
CERTIFICATE OF CORRECTION

PATENT NO. : 5,142,436

DATED : August 25, 1992

INVENTOR(S) : Soo-Cheol Lee, Kwang-Hee Jung and Chi-Ho Kim

It is certified that error appears in the above-identified patent and that said Letters Patent is hereby corrected as shown below:

Claim 13 Line 52 Column 15 "insulating" should read --insulation--.

Claim 13 Lines 56-57 Column 15 "insulating" should read --insulation--.

Claim 13 Line 64 Column 15 "insulating" should read --insulation--.

Claim 13 Line 2 Column 16 "insulating" should read --insulation--.

Claim 14 Line 17 Column 16 "aid" should read --said--.

Claim 14 Line 20 Column 16 "insulating" should read --insulation--.

Claim 20 Line 63 Column 16 "4" should read --14--.

Signed and Sealed this

Ninth Day of November, 1993

Attest:

BRUCE LEHMAN

*Attesting Officer*　　　Commissioner of Patents and Trademarks